United States Patent
Esaka

(10) Patent No.: US 8,762,344 B2
(45) Date of Patent: Jun. 24, 2014

(54) METHOD FOR MANAGING INFORMATION PROCESSING SYSTEM AND DATA MANAGEMENT COMPUTER SYSTEM

(75) Inventor: Tomonori Esaka, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/935,454

(22) PCT Filed: Sep. 17, 2010

(86) PCT No.: PCT/JP2010/005686
§ 371 (c)(1),
(2), (4) Date: Sep. 29, 2010

(87) PCT Pub. No.: WO2012/035588
PCT Pub. Date: Mar. 22, 2012

(65) Prior Publication Data
US 2012/0072397 A1     Mar. 22, 2012

(51) Int. Cl.
*G06F 17/30*     (2006.01)

(52) U.S. Cl.
USPC ........................................................ 707/652

(58) Field of Classification Search
CPC .......... G06F 11/14456; G06F 11/1448; G06F 11/1461
USPC ........................................................ 707/652
See application file for complete search history.

(56) References Cited

U.S. PATENT DOCUMENTS

| | | |
|---|---|---|
| 2004/0093361 A1 | 5/2004 | Therrien et al. |
| 2005/0038836 A1 | 2/2005 | Wang |
| 2007/0130232 A1* | 6/2007 | Therrien et al. ............... 707/204 |
| 2009/0319736 A1 | 12/2009 | Otani et al. |

FOREIGN PATENT DOCUMENTS

| | | |
|---|---|---|
| EP | 2141616 A1 | 1/2010 |
| JP | 2010-9573 A | 1/2010 |
| WO | 2004025470 A1 | 3/2004 |

OTHER PUBLICATIONS

International Search Report for PCT Application No. PCT/JP2010/005686 mailed Oct. 17, 2011.

* cited by examiner

*Primary Examiner* — Rehana Perveen
*Assistant Examiner* — Alexander Khong
(74) *Attorney, Agent, or Firm* — Volpe and Koenig, P.C.

(57) ABSTRACT

An ACL, a setting table, and backup data are used to create an inter-base data sharing file system at a base permitted to share data. This enables data to be shared by bases. In a process for restoring backup data, with reference to the ACL and the setting table, a data management computer system determines whether or not each restore destination base is permitted to share data, and executes a restore process only on restore destination bases permitted to share data.

15 Claims, 15 Drawing Sheets

FIG. 6

| Source | Destination | State |
|---|---|---|
| /publicA/baseA/dirA/FILEA1 | //CAS-A/baseA/dirA/FILEA1 | Linked |
| /publicA/baseA/dirA/FILEA2 | //CAS-A/baseA/dirA/FILEA2 | Linked |
| /publicA/baseA/dirA/dirC/ | //CAS-A/baseA/dirA/dirC/ | Linked |
| /publicA/baseA/dirD/ | //CAS-A/baseA/dirD/ | Lost |
| ... | | |

FIG. 8

| File name | Update frequency | Cache maintenance period | Sharing type | Shared file type | Administrator |
|---|---|---|---|---|---|
| 8010 | 8020 | 8030 | 8040 | 8050 | 8060 |
| — | Once a day : 02:00 | One week | READ | STUB | User A |
| /../ffileA1.txt | Once a day : 02:00 | Two weeks | READ | TTUB | User A |
| /../ffileA2.txt | Sunday : 12:00 | Two days | READ,WRITE | STUB,FILE | User A |
| /../ffileA3.txt | N/A | N/A | READ | STUB | User A |
| /../dirA4/ | Once a day : 02:00 | 0 | FULL | ALL | User A |
| /../dirA5/ | Immediately | One month | READ | STUB | User A |
| ... | | | | | |

2460

METHOD FOR MANAGING INFORMATION PROCESSING SYSTEM AND DATA MANAGEMENT COMPUTER SYSTEM

TECHNICAL FIELD

The present invention relates to a method for managing an information processing system and a data management computer system, and for example, to a technique for managing data in a storage system in a computer.

BACKGROUND ART

The amount of digital data, particularly file data, has been increasing rapidly. An NAS (Network Attached Storage) is a storage device suitable for allowing a large number of computers to share file data via a network. At present, many file data storages utilize NAS devices.

Digital data including data files needs to be stored for a long period for a variety of purposes, for example, in order to meet various legal requirements. A CAS (Content Addressed Storage) ensures invariance of data to provide a solution for long-term data archiving. In general, the current data is stored in an NAS device as long as the data is used, and is subsequently migrated to a CAS device for archiving. The migrated data is also called archive data. For example, E-mail data on an NAS device may be archived in a CAS device in order to comply with the relevant regulation.

When a data file is archived, the path name of the archived file is changed. For example, the path name of a file A is changed from //NAS-A/share/fileA to //CAS-A/archive/fileA. To allow a NAS client to be notified of the change in the file path name, stub information (also called a stub or stub data) is generated in the NAS device. The stub includes a source location in the NAS device and a file destination location in the CAS device. The stub information allows the NAS client to know that the file has been migrated and that the path name has been changed as a result of the archiving. The stub information includes the destination file path of the migrated file. The NAS client can use the stub information to determine where the archived file data is actually present. Furthermore, the NAS device and the CAS device can use a GNS (Global Namespace) to integrate namespaces.

The NAS device needs to be backed up in order to prevent data loss when the NAS device is faulty. If the NAS device and the CAS device use the GNS to integrate namespaces, backing up even the actual archive data in the CAS device wastes backup time and the storage capacity of the backup destination. Thus, as disclosed in, for example, Patent Literature 1, the device determines whether an access from the NAS client is a normal NAS access or a special NAS access for backup. If the access is for backup, the actual archive data in the CAS device is not backed up but only the stub information is backed up.

CITATION LIST

Patent Literature

PTL 1: JP Patent Publication (Kokai) No. 2010-9573A

SUMMARY OF INVENTION

Technical Problem

In some systems, a CAS device is located at a data center, and NAS devices are arranged at respective bases (for example, operation divisions of companies). The CAS device is connected to the NAS devices by a communication network such as a WAN (Wide Area Network). The data is centrally managed on the CAS device. The data stored in the CAS device is not limited to archive data. Data stored in the NAS device may be migrated (file migration) to the CAS device according to an appropriate policy, for example, if the data has not been accessed for a given period. This enables a reduction in the capacity of the NAS device required for the corresponding base. Then, the migrated data is stubbed. Thus, the NAS client can access the data in the same manner as that before the migration without being conscious that the data storage location has been changed. The stubbing is described in, for example, Patent Literature 1 and will thus not be described herein in detail. Furthermore, the NAS device at each base needs to be able to access only the CAS device at the data center. Thus, the above-described systems need no communication network among the bases, enabling a reduction in communication infrastructure costs.

In the above-described systems, some of the files possessed by each base are not to be referenced by other bases. Thus, the CAS device provides a TENANT function to create a TENANT that permits only accesses from a particular base. In view of security, the base: TENANT=1:1 is set. Then, each base constructs a file system exclusive to the base, on the TENANT. Limiting accesses to the files and directories stored in the TENANT allows security to be ensured. However, the use of the TENANT function allows file reads/writes to be limited but may fail to allow general file systems to hide even the presence of files. Some users desire to inhibit the other bases from accessing the directories exclusive to the users. Thus, even the presence of files can desirably be hidden.

In this regard, in view of security, data can be shared by the bases as follows with the base: TENANT=1:1 maintained. A TENANT is created which is separate from the TENANTs exclusive to the respective bases and which can be accessed by each base. A shared directory is created on this TENANT.

However, data sharing utilizing the shared directory requires the storage, in the shared directory, of files to be shared by users (NAS clients). This is disadvantageously cumbersome to the users. Furthermore, if copies are stored in the shared directory, the capacity of the CAS device is wasted. A de-duplication technique can be utilized to prevent the capacity from being wasted. However, the de-duplication process disadvantageously imposes loads on the CAS device. Moreover, if any original file in the exclusive directory is updated, the updated file needs to be re-stored in the shared directory by overwrite copying or the like. This is cumbersome to the users. Additionally, if the connection to the WAN is deleted or the data center is shut down during an access to the shared file, the shared file cannot be accessed.

The present invention has been made in view of these circumstances. An object of the present invention is to provide a file sharing technique which serves to prevent the capacity of the CAS device from being wasted and to reduce loads on the CAS device and which inhibits the other bases from knowing the presence of files.

Solution to Problem

To accomplish the above-described object, the present invention enables bases to share data by using backup data and setting files for the respective bases stored in the CAS device at the data center to restore required data for data sharing target bases to create a data sharing file system for the data sharing target bases. The use of the setting file enables selection of restoration of only the stubs permitted to be data-shared or restoration of both stubs and files. Furthermore, if the original data is updated, the data at data sharing destinations is also automatically updated. In this case, on the CAS device, new data is newly stored with the old data left without any change. This prevents the stubs on the data sharing file system from being unlinked and allows the stubs on the data sharing file system to be replaced with stubs linked with the new data at a set timing to update the data at the data sharing destinations. Additionally, the user (file owner) at each base or a data center administrator can freely set files or directories to be data-shared or files or directories not to be data-shared. Furthermore, if any NAS client accesses the stub data, the stub can be converted into a file and the state of the file can be maintained during a period set in the setting file. During this period, the data can be accessed even if the connection to the WAN is deleted or the data center is shut down. Additionally, if the period elapses, the file is stubbed again.

That is, in the present invention, a data management computer system (data center) manages backup data for a first sub-computer system (base A). Based on data sharing permission/inhibition information (ACL information and information indicative of a sharing range) indicative of data to be shared by bases (a plurality of sub-computer systems), the data management computer system restores at least a part of the backup data for the first sub-computer system (base A) in a second sub-computer system (base B) different from the first sub-computer system (base A). Then, the second sub-computer system (base B) stores the data restored by the data management computer system (data center), in a storage subsystem at the base B to generate a shared file system.

Furthermore, the data management computer system (data center) manages scheduling information on the restore process. For example, if the data stored in the first sub-computer system (base A) is changed (deleted or updated), the data management computer system reflects the change in the data, in the backup data. Additionally, at a timing different from that when the change in the data is reflected in the backup data, the data management computer system executes a restore process again in accordance with the scheduling information. Thus, the contents of the shared data in the backup data may be temporarily different from those of the data restored in the second sub-computer system (base B). That is, in connection with the data change in the first sub-computer system (base A), the reflection of the change in the backup data may fail to synchronize with the reflection of the change in the second sub-computer system (base B).

Some of the further features of the present invention are clarified in the description below, and others are apparent from the description or can be learned by implementing the present invention. The modes of the present invention can be achieved by elements or a combination of various elements as well as the following detailed description and the aspects of the attached claims.

It should be appreciated that the above and following descriptions are typical and illustrative and do not in any sense limit the claims or applications of the present invention.

Advantageous Effects of Invention

The present invention serves to prevent the capacity of the CAS device from being wasted and to reduce loads on the CAS device, and enables the other bases to be inhibited from knowing the presence of files.

BRIEF DESCRIPTION OF DRAWINGS

FIG. 6 is a diagram showing an example of the configuration of a stub table according to an embodiment of the present invention.

FIG. 8 is a diagram showing an example of the configuration of an inter-base data sharing setting table according to a first embodiment of the present invention.

DESCRIPTION OF EMBODIMENTS

Figure 1:
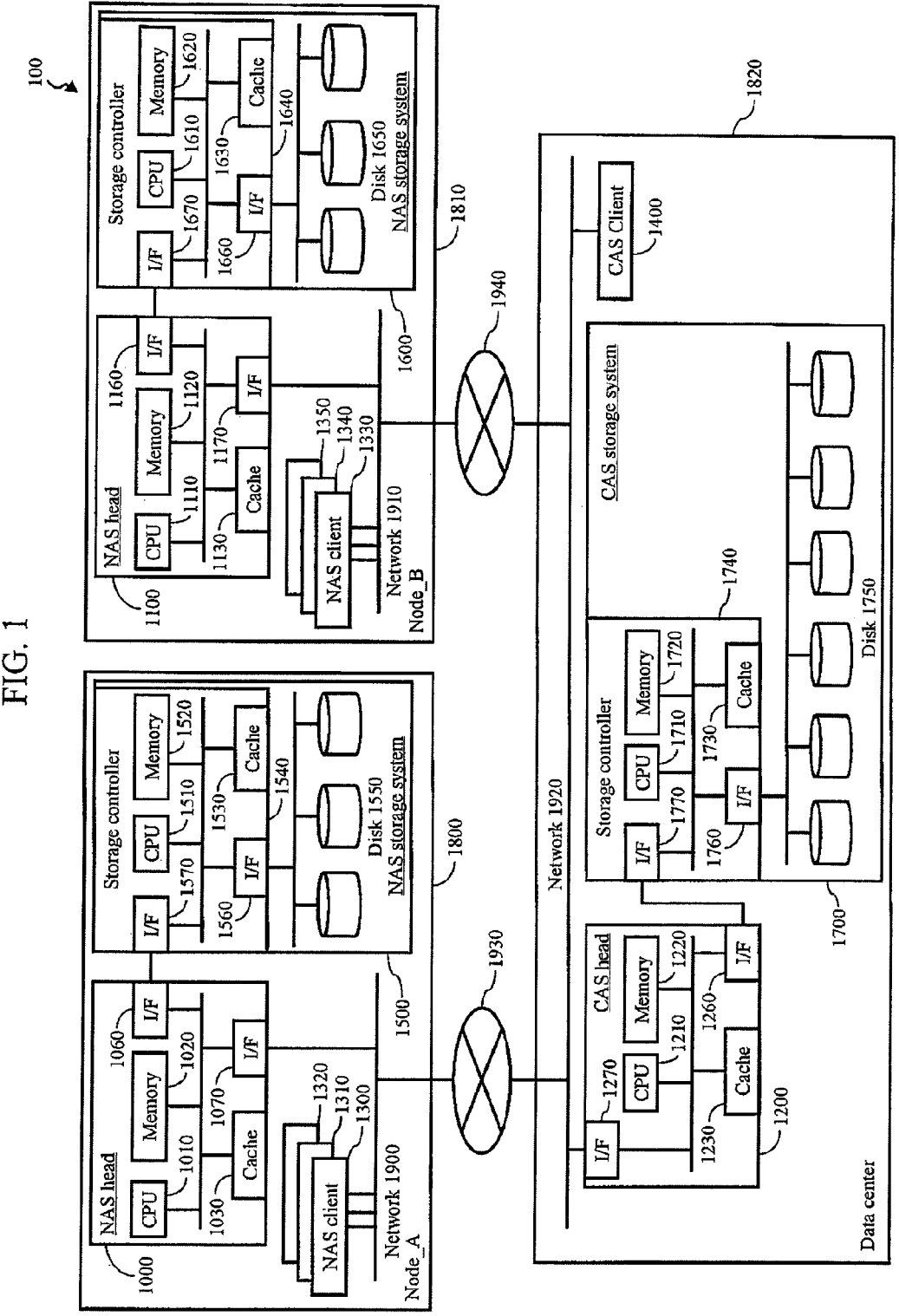
FIG. 1 is a diagram showing the physical configuration of a typical system (information processing system) according to the present invention.

Embodiments of the present invention will be described below with reference to the attached drawings. In the attached drawings, components with the same functions may be denoted by the same reference numerals. The attached drawings show specific embodiments and examples according to the principle of the present invention. However, the embodiments and examples are intended to make the reader understand the present invention and not to make the reader interpret the present invention in a limited manner.

The present embodiments are described in detail sufficient to allow those skilled in the art to implement the present invention. However, it should be understood that other implementations and aspects are possible and that configurations and structures may be changed and the components may be replaced with various other components, without departing from the technical scope and spirit of the present invention. Thus, the following description should not be interpreted in a limited manner.

Moreover, the embodiments of the present invention may be implemented by software running on a general-purpose computer, dedicated hardware, or a combination of software and hardware, as described below.

In the drawings for the specification, information used in the present invention is described using tables and lists as examples. However, the information is not limited to those provided in the structures of the tables and lists. The information may be independent of the data structure.

Furthermore, the expressions "identification information", "identifier", "name", and "ID" are used to describe the contents of the information. However, these expressions are interchangeable with one another.

According to the embodiments of the present invention, in a storage system in which NAS and CAS are integrated, data can be shared by bases. However, in the embodiments of the present invention, a communication network for NAS and CAS is not limited to the adoption of a WAN. A communication network such as a LAN (Local Area Network) can be adopted. The aspects of the present invention are not limited to the adoption of an NFS (Network File System) protocol. Any of the other file sharing protocols including a CIFS (Common Internet File System) and an HTTP (Hypertext Transfer Protocol) may be adopted.

(1) First Embodiment

<System Configuration>

Figure 2:
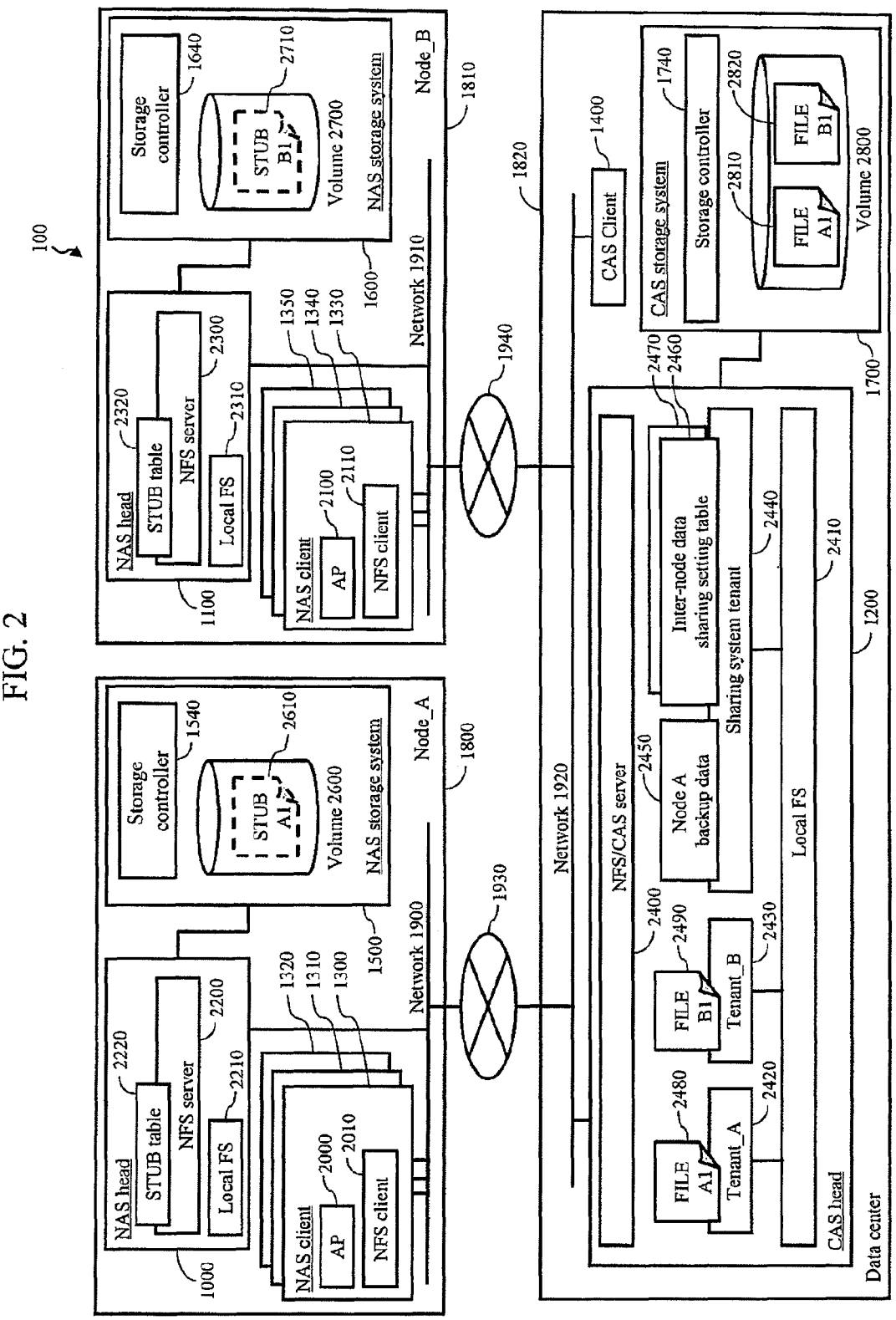
FIG. 2 is a diagram showing the physical and logical configuration (1) of the information processing system according to the present invention in further detail.
Figure 3:
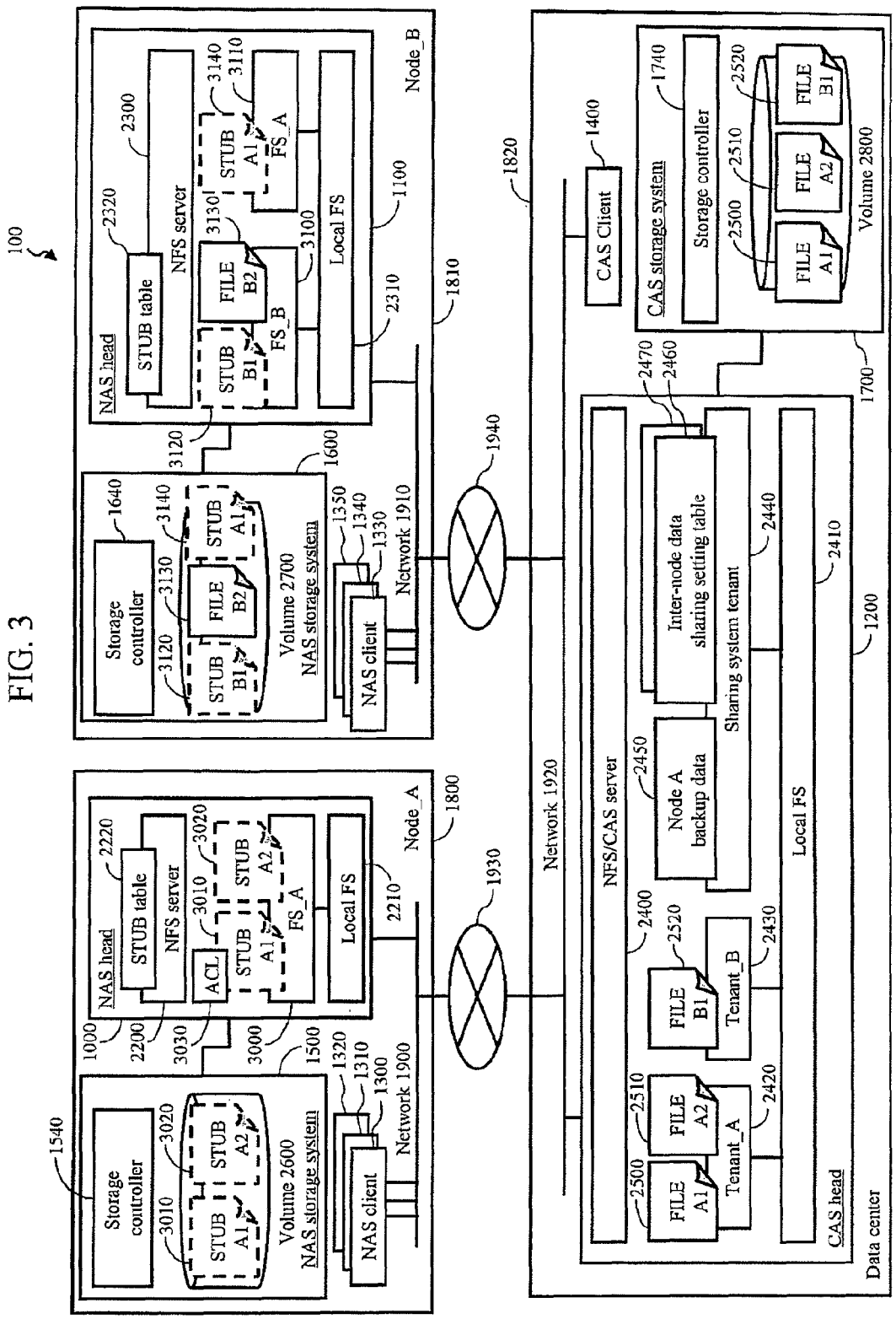
FIG. 3 is a diagram showing the physical and logical configuration (2) of the information processing system according to the present invention in further detail.

FIG. 1 is a diagram schematically showing the physical configuration of a system (an information system, an integrated storage system, or a computer system) 100 according to an embodiment of the present invention. Furthermore, FIGS. 2 and 3 show the physical and logical configuration of the system in further detail.

The computer system 100 includes a plurality of sub-computer systems 1800, 1810, . . . arranged at the respective bases, a data center system 1820 formed of CAS. Each of the sub-computer systems 1800 and 1810 is connected to the data center system 1820 via networks 1930 and 1940, respectively.

Each of the sub-computer systems 1800 and 1810 includes any of a plurality of NAS clients 1300 to 1350, NAS heads 1000 and 1100, and NAS storage systems 1500 and 1600, respectively. The NAS clients 1300 to 1320 are connected to the NAS head 1000 and the NAS head 1000 is connected to the MAS storage system 1500, via a network 1900. This also applies to the sub-computer systems 1810 at the other bases.

Furthermore, the data center system 1820 includes a CAS head 1200, a CAS storage system 1700, and a CAS client 1400 which are connected together via a network 1920.

The network 1900 is an intra-base LAN (LAN inside a base) for the base A 1800. The network 1910 is an intra-base LAN for the base B 1810. The network 1920 is an intra-data-center LAN (LAN inside a data center) for the data center 1820. The network 1930 is a WAN and connects the base A 1800 and the data center 1820 together via a network. The network 1940 is a WAN and connects the base B 1810 and the data center 1820 together via a network. Of course, the types of the network are not limited to those described above. A variety of networks can be utilized.

In the computer system 100 shown in FIG. 1, the NAS heads 1000 and 1100, the CAS head 1200, the NAS clients 1300, 1310, 1320, 1330, 1340, and 1350, and the CAS client 1400 include CPUs 1010, 1110, 1210 and memories 1020, 1120, and 1220, respectively. However, for the NAS clients and CAS client, the illustration of the CPUs and memories is omitted. The NAS heads 1000 and 1100 and the CAS head 1200 further include caches 1030, 1130, and 1230, respectively.

The NAS storage systems 1500 and 1600 and the CAS storage system 1700 include storage controllers 1540, 1640, and 1740, respectively, and disk drives 1550, 1650, and 1750, respectively. The storage controllers 1540, 1640, and 1740 include CPUs 1510, 1610, and 1710, respectively, memories 1520, 1620, and 1720, respectively, and caches 1530, 1630, and 1730, respectively.

As shown in FIG. 1, each of the components includes at least one interface (I/F) via which the component is coupled to a network or another device. The NAS head 1000 includes I/Fs 1060 and 1070. The NAS head 1100 includes I/Fs 1160 and 1170. The CAS head 1200 includes I/Fs 1260 and 1270. The storage controller 1540 includes I/Fs 1560 and 1570. The storage controller 1640 includes I/Fs 1660 and 1670. The storage controller 1740 includes I/Fs 1760 and 1770. Furthermore, the NAS clients and CAS client also include I/Fs but this is not shown in the drawings.

With reference to FIG. 2, files and applications mounted in the components of the computer system 100 will be described.

The NAS client 1300 includes an AP (application) 2000 and an NFS client 2010. The NAS client 1330 includes an AP 2100 and an NFS client 2110. Like the NAS client 1300, the CAS client 1400 includes an AP and an NFS client, but this is not shown in the drawings.

The NAS head 1000 includes an NFS server program 2200, a local file system 2210, and a stub table 2220. The NAS head 1100 includes an NFS server program 2300, a local file system 2310, and a stub table 2320. The CAS head 1200 includes an NFS/CAS server program 2400, a local file system 2410, a tenant A 2420, a tenant B 2430, and a sharing system tenant 2440. The tenant A 2420 is associated with a file A1_2480. The tenant B 2490 is associated with a file B1_2490. Furthermore, the sharing system tenant 2440 is associated with backup data 2450 at the base A and inter-base data sharing setting tables 2460 and 2470 (sharing setting tables between bases). Here, the expression "associated" means that since FIG. 2 shows a logical configuration, for example, the actual data in the file A1 is present in a volume 2800 but appears to the bases (sub-computer systems) to lie in the tenant A 2420.

The NAS storage system 1500 includes a volume 2600 in which data handled by the NAS head 1000, for example, stubs, files, and various management tables are stored. Furthermore, the NAS storage system 1600 includes a volume 2700 in which data handled by the NAS head 1100, for example, stubs, files, and various management tables are stored. The CAS storage system 1700 includes a volume 2800 in which data handled by the CAS head 1200, for example, files, various management tables and backup data are stored.

The NAS head 1000 has a file sharing function and is integrated with the NAS storage system 1500, which provides a disk volume in which file data is stored. The NAS head 1000 and the NAS storage system 1500 are combined together to operate as an NAS device.

The NFS server program 2200 is an application program providing an NFS function. Furthermore, the local file system 2210 is a file system for the NAS head 1000 and may be ext2 (second extended file system) for Linux, ext3 (third extended file system), or an NTFS (Windows NT File System). The storage controller 1540 provides a block-type storage function such as an FC-SAN (Fibre Channel Storage Area Network). The NAS head 1100 and the NAS storage system 1600 are combined together to operate as an NAS device to provide functions similar to those described above.

The CAS head 1200 provides a data archive function and is combined with the CAS storage system 1700, which provides a disk volume in which data is stored. The CAS head 1200 and the CAS storage system 1700 are combined together to operate as a CAS device.

The volume 2600 stores stub data 2610 linked with the actual file stored in the volume 2800. The sub data 2610 is expressed as a symbolic link for a soft link. The symbolic link is a file object stored in the volume 2600 and shared by the NAS head 1000 via the NFS server 2200. The symbolic link has location information on other file objects or other directory objects. When an NAS client accesses the symbolic link, other locations indicated by the symbolic link and in which actual data is held are referenced.

The NAS client 1300 accesses the NFS file server program 2200 in the NAS head 1000. The NFS file server program 2200 accesses the volume 2600 on the NAS storage system 1500, coupled to the NAS head 1000, instead of the NAS client 1300. The volume 2600 includes stub data providing location information on actual data stored on the volume 2800 in the data center 1820. That is, the actual data corresponding to stub data is present in the CAS storage system 1700, a part of the CAS system. The actual data file is delivered from the volume 2800 in the CAS system to the NFS server program 2200 in the NAS head 1000 by the CAS head 1200. The data file is then delivered to the NAS client 1300, having initially requested the data file.

The NAS client 1300 includes an NFS client function 2010 allowing the AP 2000 to access data in data files on the NAS device via an NFS protocol. The NAS client 1300 and the NAS device are combined together by the network 1900, which can be configured using a LAN (Local Area Network).

An AP (application (not shown in the drawings)) for the CAS client 1400 has an archive function. When the AP for the CAS client 1400 issues a request for migration of data available in a data file in the NAS device from the NAS device to the CAS device in order to archive the file data, the NAS head 1000 generates and leaves stub data for the data at a location in the NAS device where the migrated data file is previously present. The NAS head 1000 further transfers the actual file data to the CAS device. The location where the stub data is stored is the same as that of the file from which the data has been migrated by the AP. The relationship between the stub data and the migrated file is managed by the stub tables 2220 and 2320 shown in FIG. 4.

Any of various techniques can be adopted to integrate the NAS devices and the CAS device together. In the present embodiment, for example, a GNS technique is adopted. If the GNS is adopted, the NAS client 1300 accesses the NAS head 1000 to acquire archive data on the CAS via the stub data 2610. That is, the NAS client 1300 avoids a direct access to the CAS head 1200. This allows the NAS client to see a single integrated namespace formed of a large number of NAS and CAS devices.

FIG. 3 is a diagram showing a system logical configuration in which the base B shares some files in the base A. In the example described below in connection with configurations and operations, the base B shares some files in the base A.

The NAS head 1000 includes a file system A 3000 on the local file system 2210 in which files for the own base are stored. The file system A 3000 includes a stub A1_3010 and a stub A2_3020. Moreover, each of the stub data, files, and directories includes ACL information (which is shown only on the stub A1). These data are stored in the volume 2600.

The NAS head 1100 includes a file system B 3100 in which the files for the own base are stored and a file system A' 3110 required to access the shared files at the base A; the file systems B 3100 and A' 3110 are arranged on the local file system 2310. The file system B 3100 includes a stub B1_3120 and a file B2_3130. The file system A' 3110 includes a stub A1_3140. These data are stored in the volume 2700.

The CAS head 1200 includes a tenant A 2420 logically associated with the actual data (stored in the volume 2800) in the files stubbed at the base A to provide the actual data to the base A, a tenant B 2430 logically associated with the actual data (stored in the volume 2800) in the files stubbed at the base B to provide the actual data to the base B, and a sharing system tenant 2440 associated with backup data and setting files (the actual data is present in the volume 2800) stored by the administrator or the like; the tenants A 2420 and B 2430 and the sharing system tenant 2440 are arranged on the local file system 2410.

The tenant A 2420 includes a file A1_2500 and a file A2_2510. The tenant B 2430 includes a file B1_2520. The sharing system tenant 2440 includes backup data 2450 for the base A and inter-base data sharing setting tables 2460 and 2470. As described above, these data indicate a logical relationship, and the actual data is stored in the volume 2800. Furthermore, the backup data 2450 for the base A and the inter-base data sharing setting tables 2460 and 2470 are also stored in the volume 2800. However, some of these data are not shown in the volume 2800.

The tenant A 2420 provides a namespace for the NAS head 1000 at the base A and performs access control such that only the user at the base A can access the tenant A 2420. The tenant A 2420 thus provides a namespace exclusive to the user at the base A. However, as described below, only accesses made, via the stub data, by the user at the base B are permitted. This enables the base B to share some of the files at the base A.

Furthermore, the actual data in the files stubbed by the NAS head 1000 is stored in the tenant A 2420.

Similarly, the tenant B 2430 provides a namespace exclusive to the user at the base B. The system tenant 2440 is a special namespace in which the backup data, the setting files, and the like are stored. Access control is performed such that the system tenant 2440 cannot be accessed by the general users at the bases but only by the administrators of each base and the data center. For example, the administrator of the base A stores the backup data 2450 present at the base A, in the system tenant 2440. Furthermore, the administrator of the data center stores the inter-base sharing setting tables 2460 and 2470 in the system tenant 2440. Here, the term "store" is used for convenience. However, each tenant has a logical relationship with the files and data, and the actual data itself is stored in the volume 2800 as described above.

The backup data 2450 at the base A allows the file system A 3000 to be recovered when a disaster occurs at the base A or when a hardware/software fault occurs. Unlike in the case of normal backup, as described in Patent Literature 1, the actual data in a stubbed file is not backed up but only the stub data for the file is backed up. For a non-stubbed file, the file containing the actual data is backed up. That is, the backup data includes a mixture of the stub data and file. Furthermore, each of the backed-up stub data, files, and directories includes ACL information.

The file system A' 3110 at the base B is an inter-base sharing file system (a sharing file system between bases) created by the administrator of the base B using the backup data 2450 at the base A and the inter-base data sharing setting tables 2460 and 2470. Although described below in detail with reference to FIG. 10, the restore process restores only the stub data, files, and directories permitted to be shared by the base B, with reference to the ACL information in each of the backed-up stub data, files, and directories and the inter-base data sharing setting tables 2460 and 2470. The restore process creates a file system A' 3110 that can access only the stub data, files, and directories permitted to be shared by the base B.

<Summary of a File Acquisition Operation>

Figure 4:
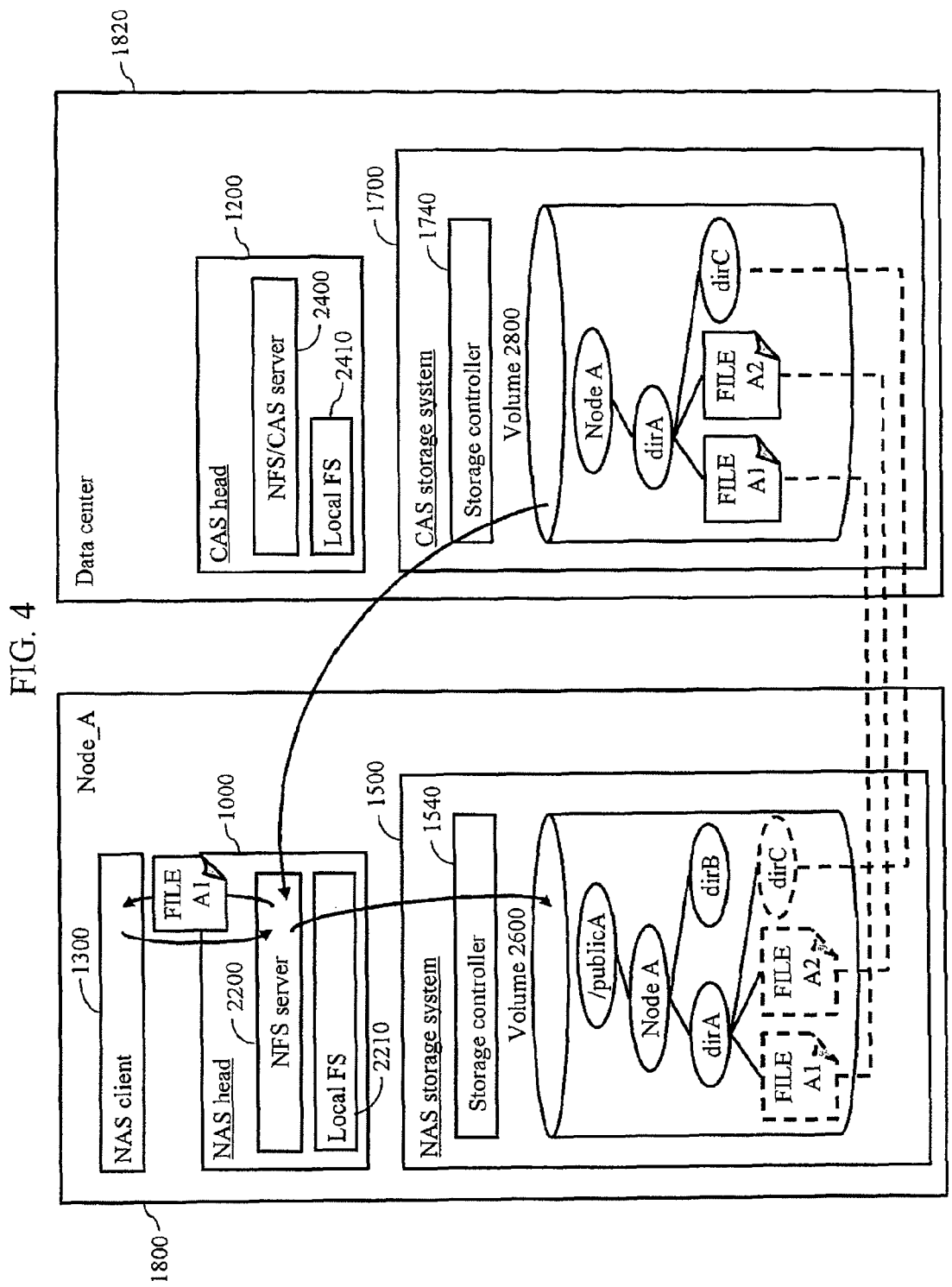
FIG. 4 is a diagram illustrating an operation of reading data from a base A.
Figure 5:
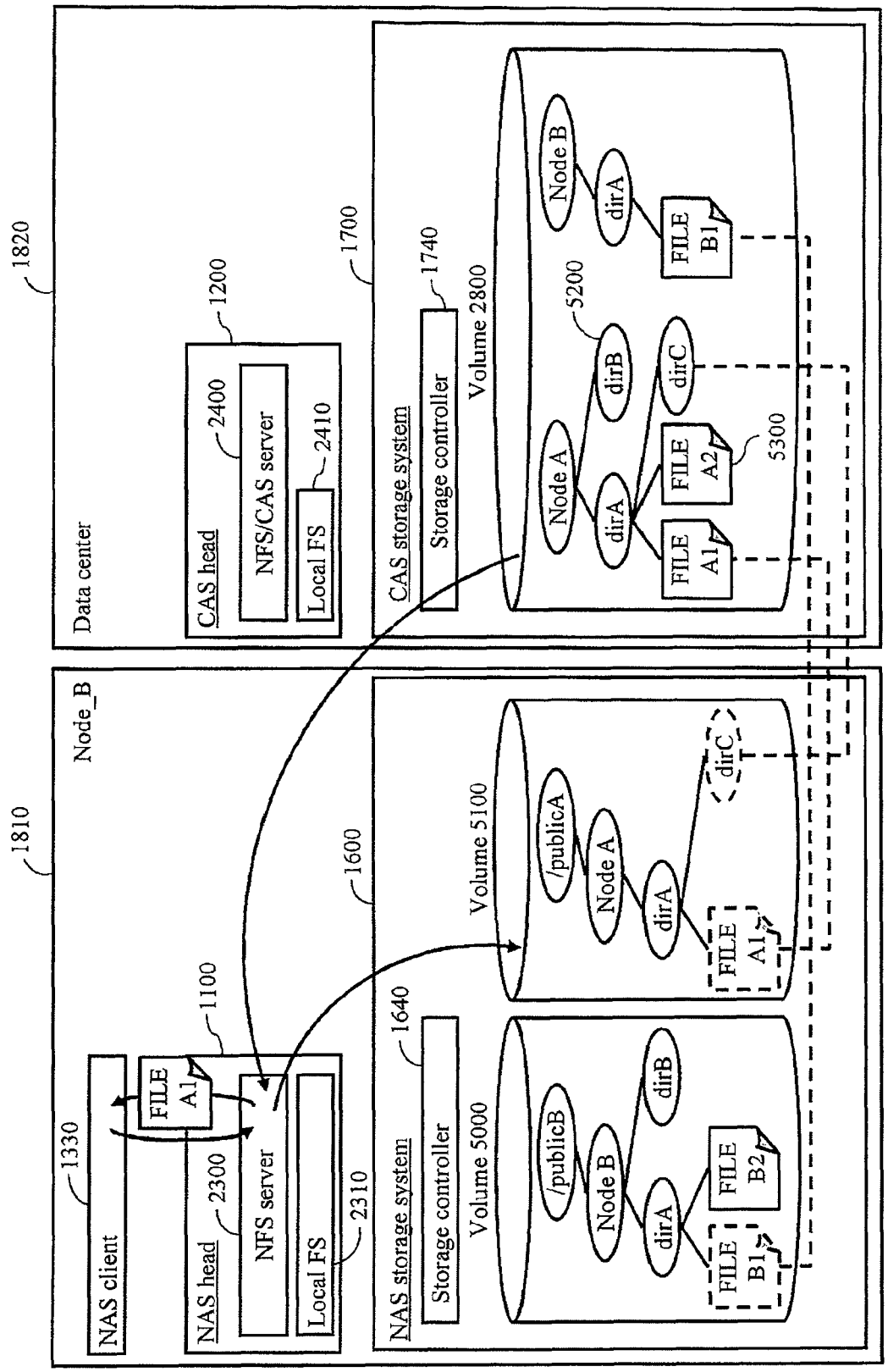
FIG. 5 is a diagram illustrating an operation of reading data from a base B.

FIGS. 4 and 5 is a conceptual drawing illustrating an operation performed to acquire files from the bases A and B.

With reference to FIG. 4, the case where at the base A, the NAS client 1300 accesses the file system A 3000 for the own base will be described. The NAS client 1300 is accessing the file server program 2200 in the NAS head 1000. Instead of the NAS client 1300, the NFS file server program 2200 accesses the volume 2600 on the NAS storage system 1500, coupled to the NAS head 1000.

The volume (NAS) 2600 contains stub data providing location information on the actual data stored on the volume (CAS) 2800. Thus, the actual data corresponding to the stub data is present in the volume 2800 in the CAS storage system 1700, which is a part of the CAS system. The actual data file is delivered from the volume 2800 in the CAS system to the NFS server program 2200 in the NAS head 1000 via the CAS head 1200. The actual data file is then delivered to the NAS client 1300, having initially requested the data file.

Furthermore, the actual data file received from the CAS system is used to convert the stub data into a normal file containing the actual data. The normal file is then deleted. Thus, the volume 2600 functions as a kind of cache. The next time the volume 2600 is accessed, the access can be carried out at a high speed without the need for communication with the CAS system. Furthermore, even if the WAN communication is disrupted, the volume 2600 can be accessed. Arrows in FIG. 4 indicate this process.

Now, with reference to FIG. 5, the case where at the base B, the NAS client 1330 accesses the data sharing file system. A' 3110 will be described. The NAS client 1330 is accessing the NFS file server program 2300 in the NAS head 1100. Instead of the NAS client 1330, the NFS file server program 2300 accesses a volume 5100 on the storage system 1600, coupled to the NAS head 1100.

The volume (NAS) 5100 contains stub data providing location information on the actual data stored on the volume (CAS) 2800. Thus, the actual data is present in the volume 2800 in the CAS storage system 1700, which is a part of the CAS system. The actual data file is delivered from the volume 2800 in the CAS system to the NFS server program 2300 in the NAS head 1100 via the CAS head 1200. The actual data file is then delivered to the NAS client 1330, having initially requested the data file. Arrows in FIG. 5 show this process.

Furthermore, the user (each NAS client) at the base A can access a file A2_5100. However, a file A2_5300 is inhibited from being shared by the user (each NAS client) at the base B. Thus, the volume 5100 contains no stub data allowing the file A2_5300 to be accessed. Hence, the user at the base B cannot access the file A2_5300. Similarly, a directory dirB 5200 is set to be unshared, so that the user at the base B cannot see the dirB 5200.

<Configuration Example of the Stub Table>

FIG. 6 is a diagram showing a configuration example of the stub table 2220. The stub table 2220 is a table in which the source, destination, and state of each of the data files stored in the CAS system (data center 1820) are recorded. Here, the table form is adopted. However, any management form may be adopted provided that the relationship between the source and the destination and the state can be managed. These data may be simply called stub configuration information. This also applies to various tables described below. The management form is not limited to the table.

A source 6010 is information including a file path to the source location of a data file in the NAS system present before archiving of the data file in the CAS system. Furthermore, a destination 6020 is information indicative of a file path to a destination location in the CAS system where the data file is actually stored. Moreover, a state 6030 is information indicating whether the stub data is linked with the actual file or the link between the stub data and the actual file has been lost. The link is lost when, for example, the archive data is deleted and is absent from the CAS device.

<Configuration Example of ACL (Access Control List) Information>

Figure 7:
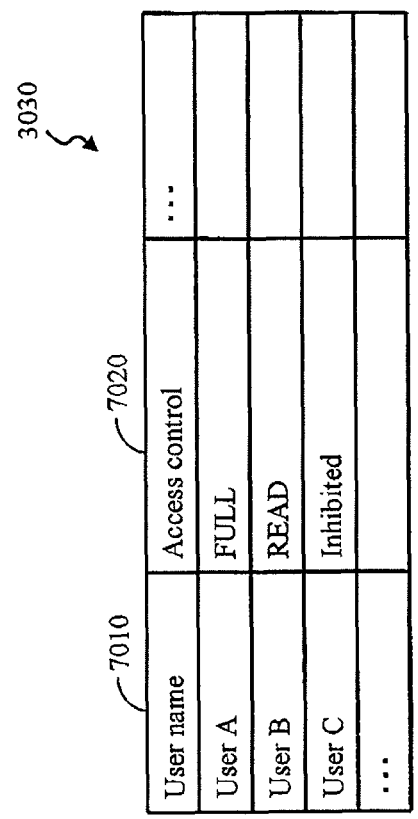
FIG. 7 is a diagram showing an example of the configuration of an ACL table according to the embodiment of the present invention.

FIG. 7 is a diagram showing a configuration example of the ACL information 3030. The ACL information is included in each of the stubs, files, and directories. The ACL 3030 includes a user name 7010 and an access control right 7020. The example in FIG. 7 indicates that a user A can execute all actions including read and write for the file and the like provided with the ACL information and that a user B can execute only read. On the other hand, a user C cannot access the file and the like.

<Configuration Example of the Inter-Base Data Sharing Setting Table>

FIG. 8 is a diagram showing a configuration example of the inter-base data sharing setting table 2460. The inter-base data sharing setting table 2460 is a table in which a setting for the data sharing between bases is recorded. The inter-base data sharing setting table 2460 is referenced when a data sharing file system is created at each base by the restore process. The data sharing file system reflects the setting.

The inter-base data sharing setting table 2460 contains a file name 8010, an update frequency 8020, a cache maintenance period 8030, a sharing type 8040, a shared file type 8050, and an administrator 8060, as constituent items. One inter-base data sharing setting table 2460 is prepared for each base, for example, a table for the base A and a table for the base B.

The file name 8010 is information indicating which of the files is related to the setting. Instead of the file name, a directory name may be registered. If a directory name is registered, the sharing setting is applied to all the files in the specified directory. However, if any of the files in the directory is registered in a different row, the setting for the file is given top priority. Which of the users can access each file is set by the above-described ACL information.

The update frequency 8020 indicates a setting for timings at which the data sharing file system is updated by re-restoration. That is, if the base A updates a certain shared file, the user at the base B cannot necessarily immediately utilize the updated shared file. The updated file needs to be made available. This involves the restore process. Until the updated file is restored, the user at the base B utilizes the non-updated shared file.

The restore process may be set to be executed at midnight or on the weekend in view of possible loads on the system. Alternatively, if the update is to be immediately reflected, "immediately" is set such that the restore process is executed immediately after migration and re-backup. This will be described below in detail with reference to FIG. 11.

The cache maintenance period 8030 is information indicative of a period from the conversion, into a file, of stub data accessed by any NAS client until the file is re-stubbed. For example if the cache maintenance period 8030 is set to one week, the state of the file is maintained for one week after the access. During this period, the file can be accessed without the need for communication with the data center. When one week elapses from the access, the file is stubbed again. Furthermore, if the cache maintenance period 8030 is set to "0", the file is stubbed immediately after being closed by the NAS client.

The sharing type 8040 is information indicative of the type of data sharing. For example, if the sharing type 8040 is set to READ, accesses to the data sharing file system permitted for the user at the base B are only for read. In the embodiment of the present invention, it is mainly assumed that the sharing type 8040 is set to READ. However, the sharing type 8040 is not limited to READ. If the sharing type 8040 is set to READ & WRITE, the file can also be edited. However, this involves the following restrictions. Changes made to files by the user at the base B fail to be reflected in the file system A 3000 at the base A. The file system A' 3110 is re-restored to the latest state of the file system A 3000 at the base A at timings set in the update frequency 8020. Thus, file updates performed by the user at the base B are invalidated. Thus, if a file updated by the user at the base B is to be held, the user needs to store the updated file somewhere in the base B.

The shared file type 8050 is information indicative of the type of a data sharing target file. For example, if the shared file type 8050 is set to STUB, only the stub data included in the backup data 2450 at the base A and permitted to be shared is restored; both the stub data and file are stored in the backup data 2450. Thus, a data sharing file system A' 3110 is created. If the shared file type 8050 is set to STUB,FILE, the file is also restored. Basically, it is assumed that only the stub data is restored. However, it is inefficient to acquire backup data for the stub data at the base A for data sharing. Thus, the present setting can be provided to enable sharing of backup data acquired for recovery performed when a disaster occurs at the base A or when a hardware/software fault occurs.

The administrator 8060 is information indicative of a user who can set and change the inter-base data sharing setting table 2460. For example, the owner of a file generally sets data sharing for the file. Thus, an administrator is set for each base, in the first embodiment, for the base A. Furthermore, an administrator may be set for the data center. In general, an administrator is set for each table but may be set for each file or directory.

A configuration example of the inter-base data sharing setting table 2460 has been shown. However, setting data sharing for each file or directory is burdensome. Thus, data sharing can be set for all the files and directories. For example, a common setting can be provided by setting the file name 8010 to "-" and making other required settings. Then, file and directories to be set differently from those with the common setting are additionally registered in an inter-base data sharing setting table 2560. The additionally set files and directories are then exceptionally set differently from those with the common setting.

<Process for Setting a Data Sharing File System>

Figure 9:
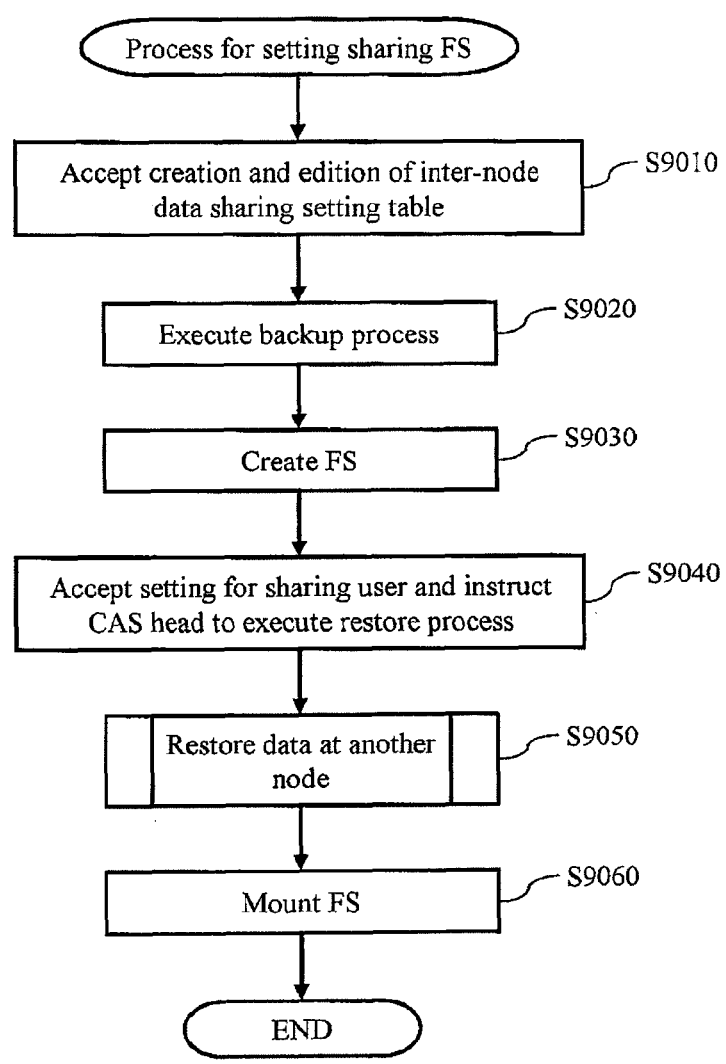
FIG. 9 is a flowchart illustrating a procedure and a process for creating a data sharing FS at another base according to the embodiment of the present invention.

FIG. 9 is a flowchart illustrating a process for setting a data sharing file system according to the embodiment of the present invention, for example, the file system A' 3110 in brief.

First, in 59010, the CAS head 1200 (CPU 1210) accepts the inter-base data sharing setting table 2460 created by the administrator, for example, the user at the base A by operating the CAS client 1400. The CAS head 1200 then stores the inter-base data sharing setting table 2460 in the sharing system tenant 2440. At this time, since the base A and the data center may be geographically distant from each other, the user at the base A may operate the CAS client through a remote access from the base A. Furthermore, for example, the user at the base A may request the administrator of the data center to make required settings, and the administrator of the data center may operate the CAS client for the settings. In actuality, the CAS head 1200 operates to store the inter-base data sharing setting table 2460 in the volume 2800 and then logically associates the table 2460 with the sharing system tenant 2440.

In S9020, in response to a request from the user at the base A, the NAS head 1000 (CPU 1110) at the base A transfers the files and stub data stored in the NAS storage system 1500 at the base A, to the CAS head 1200 in order to backup the files and stub data. The CAS head 1200 receives and stores the files and stub data in the sharing system tenant 2440 as backup data 2450 (as described above, the actual backup data is located in the volume 2800 and logically associated with the sharing system tenant 2440). A schedule is set for the backup. The backup may be automatically executed by the system.

In S9030, in response to a request from the user (administrator) at the base B, the NAS head 1100 at the base B creates a data sharing file system, for example, a file system A' 3110.

In S9040, the NAS head 1100 at the base B accepts, as a parameter, a "sharing user" input by the user at the base B and specifying "who is permitted to access the file system". The NAS head 1100 holds the sharing user in the memory. Then, the NAS head 1100 at the base B instructs the CAS head 1200 to restore required data in the file system A' 3110.

In S9050, the CAS head 1200 receives the instruction from the NAS head 1100 and cooperates with the NAS head 1100 in restoring the required data in a data sharing file system at another base (which means the base B). The processing in S9050 will be described with reference to FIG. 10. In the restore process, for example, when user B is input as a sharing user, only the files and directors permitted to be shared with the user B are restored. If all the files and directories are restored with ACL information added thereto, accesses from users inhibited from sharing the files and directories may be rejected. However, these users may know the presence of the files. Thus, for the files inhibited from being shared, the embodiment of the present invention avoids restoring the stub data and the files themselves to prevent even the presence of the files from being known. This improves security. Furthermore, a plurality of sharing users may be input. Additionally, the input sharing user is stored in the file system A' 3110 so that during re-restoration described below with reference to FIG. 11, this data can be re-restored without the need to input any parameter.

In S9060, after the restore process is completed, the NAS head 1100 at the base B mounts the file system A' 3110.

Thus, the file system A' 3110 accessible to the user at the base B is created.

<Details of the Restore Process>

Figure 10:
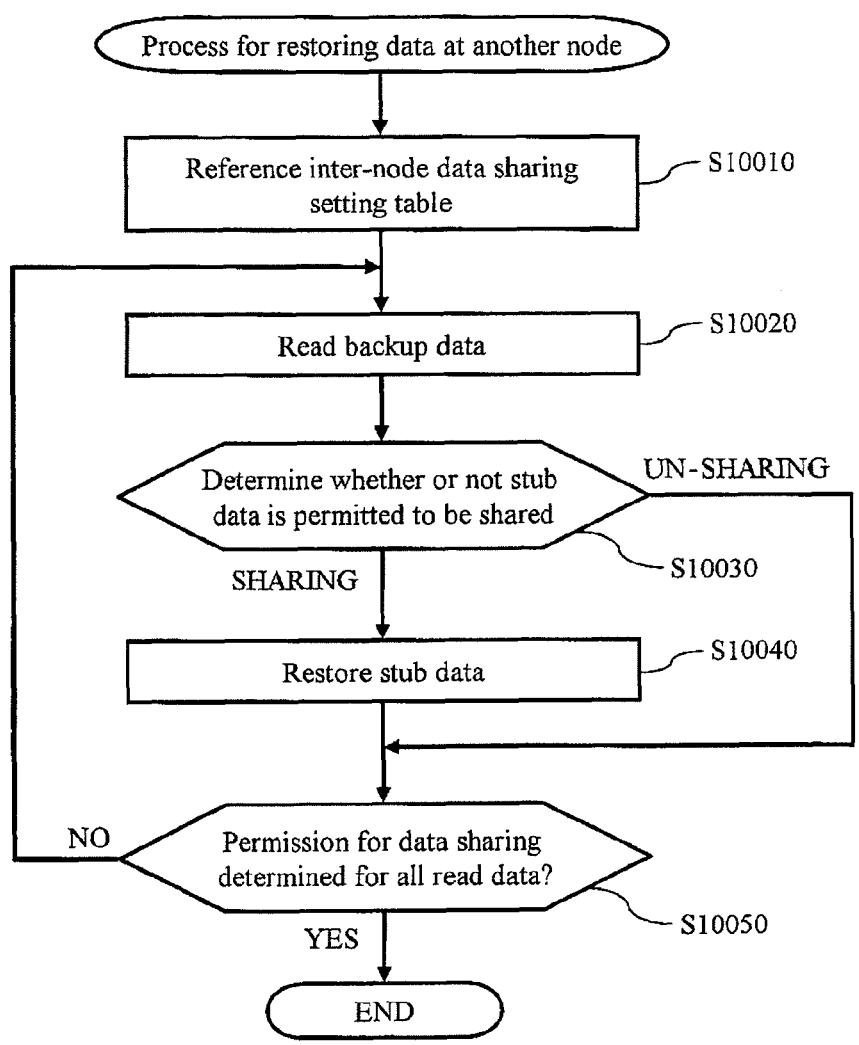
FIG. 10 is a flowchart illustrating a process of restoring required data at another base (S9050 in FIG. 9) in detail.

FIG. 10 is a flowchart illustrating a process for restoring required data in a data sharing file system at another base (base B) in detail. The present process is executed, for example, by the cooperating NAS head 1100 and the CAS head. As shown in S9040, the "sharing user" is input as an input parameter.

In S10010, the CAS head 1200 references the inter-base data sharing setting table 2460. The restore process is executed based on the setting values in the table.

In S10020, the CAS head 1200 reads the files and the like stored in the backup data 2450 and which are to be restored, one by one. The CAS head 1200 then transmits the files and the like to the NAS head 1100. At this time, if the sharing file type 8050 in the inter-base data sharing setting table 2460 is set to only STUB, the CAS head 1200 reads only the stub data and avoids restoring the files. Furthermore, if the sharing file type 8050 is set to STUB,FILE, the CAS head 1200 also reads the files. In the description of the following example, the sharing file type 8050 is set to only STUB.

In S10030, the NAS head 1100 references the ACL information on the read stub data to determine whether or not the stub data is permitted to be shared with the user indicated by the input parameter "sharing user". If the data sharing is determined to be permitted, the process proceeds to S10040. If the data sharing is determined to be inhibited, the process proceeds to S10050. If the data sharing is determined to be inhibited, the stub data is not restored.

In S10040, the NAS head 1100 restores the stub data.

In S10050, the NAS head 1100 determines whether or not all the stub data included in the backup data has been subjected to the sharing determination in S10030. If any stub data has not been subjected to the sharing determination, the process is shifted to S10020. If all of the stub data has been subjected to the sharing determination, the present process is terminated.

<Re-Restore Process>

Figure 11:
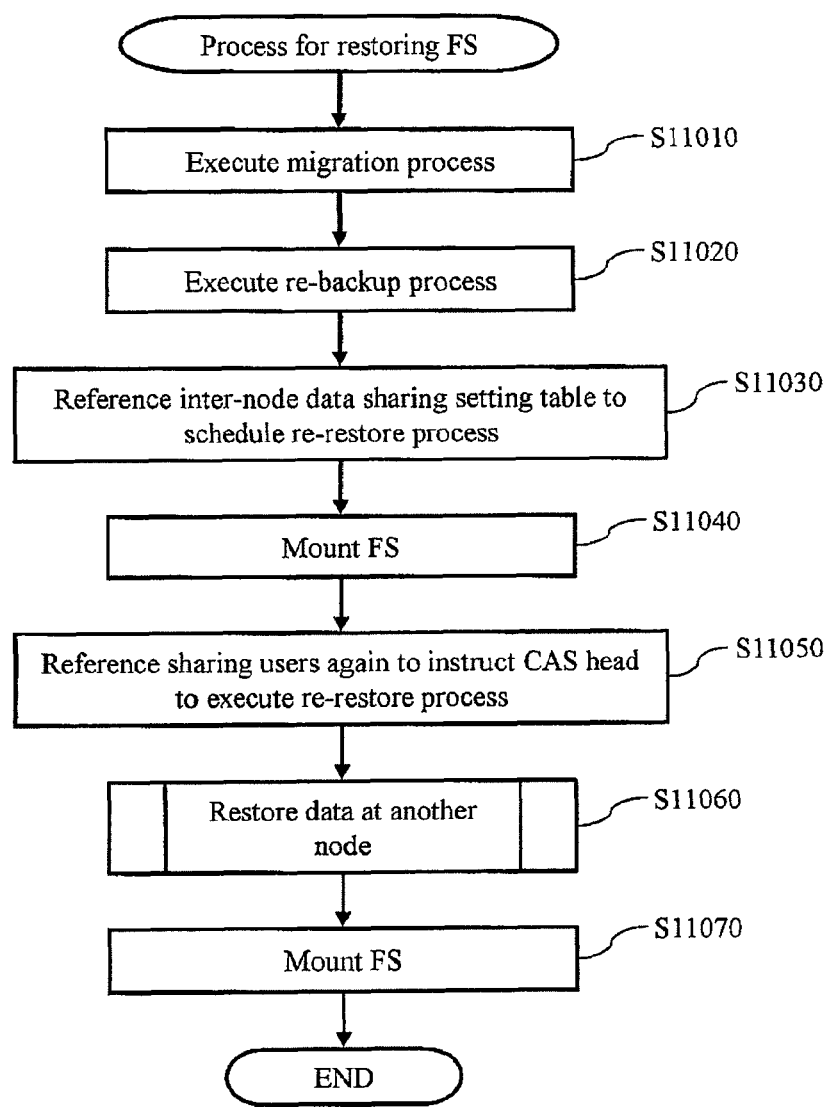
FIG. 11 is a flowchart illustrating a procedure and a process for updating the data sharing FS at another base according to the embodiment of the present invention.

FIG. 11 is a flowchart illustrating a re-restore process, that is, a process for bringing a data sharing file system into the latest state. If file update, addition, or deletion is executed at the base A, stub data accessed by the NAS client is returned to the corresponding file, and the update, addition, or deletion is executed on the files on the file system A 3000. This will be described below with reference to FIG. 12. At this point in time, the files on the tenant A 2420 are not subjected to update, addition, or deletion. Thus, the change made at the base A is also not reflected in the file system A' 3110, which references the files on the tenant A 2420. The change in the file is reflected in the tenant A 2420 when stubbing is carried out for a migration process. Hence, the change in the file is not reflected in the tenant A 2400 as long as the migration process is not executed. Furthermore, when the change in the file is reflected in the tenant A 2420 as a result of the migration process, new data is added with the old data left without any change. This is to prevent a possible situation in which because the stub data on the file system A' 3110 references the old data, changing or deleting the old data leads to delinking, precluding the base B from accessing the old data. The old data is automatically deleted when a given period has elapsed or manually deleted by the administrator. That is, the file system A' 3110 references the old data until the process shown in FIG. 11 is executed. When the process shown in FIG. 11 is executed, the referencing is switched to the latest data.

In S11010, during the migration process, the NAS head 1000 at the base A stubs and stores the relevant file (for example, the file updated at the base A) in the file system A 3000. The migration process brings the tenant A 2420 into the latest state.

In S11020, since the contents of the file system A 3000 have been changed, the CAS head 1200 acquires the backup data 2450 at the base A again.

In S11030, the CAS head 1200 references the update frequency 8020 in the inter-base data sharing setting table 2460 to schedule a re-restore process for the file system A' 3110.

In S11040, at the scheduled time, the NAS head 1100 at the base B unmounts the file system A' 3110.

In S11050, the NAS head 1100 at the base B uses the "sharing user" input for the last restoration, as a parameter again to instruct the CAS head 1200 to re-restore required data in the file system A' 3110.

In S11060, the CAS head 1200 and the NAS head 1100 cooperate with each other in executing a re-restore process. The details of this process are the same as those of the process shown in FIG. 10.

In S11070, after the restore process is completed, the NAS head 1100 remounts the file system A' 3110 to bring the file system A' 3110 into the latest state.

The process shown in FIG. 11 is automatically periodically executed by the system and need not be carried out by the user or the administrator. Of course, the user and the administrator may manually execute the process.

<Process Executed During a Stub Data Access>

Figure 12:
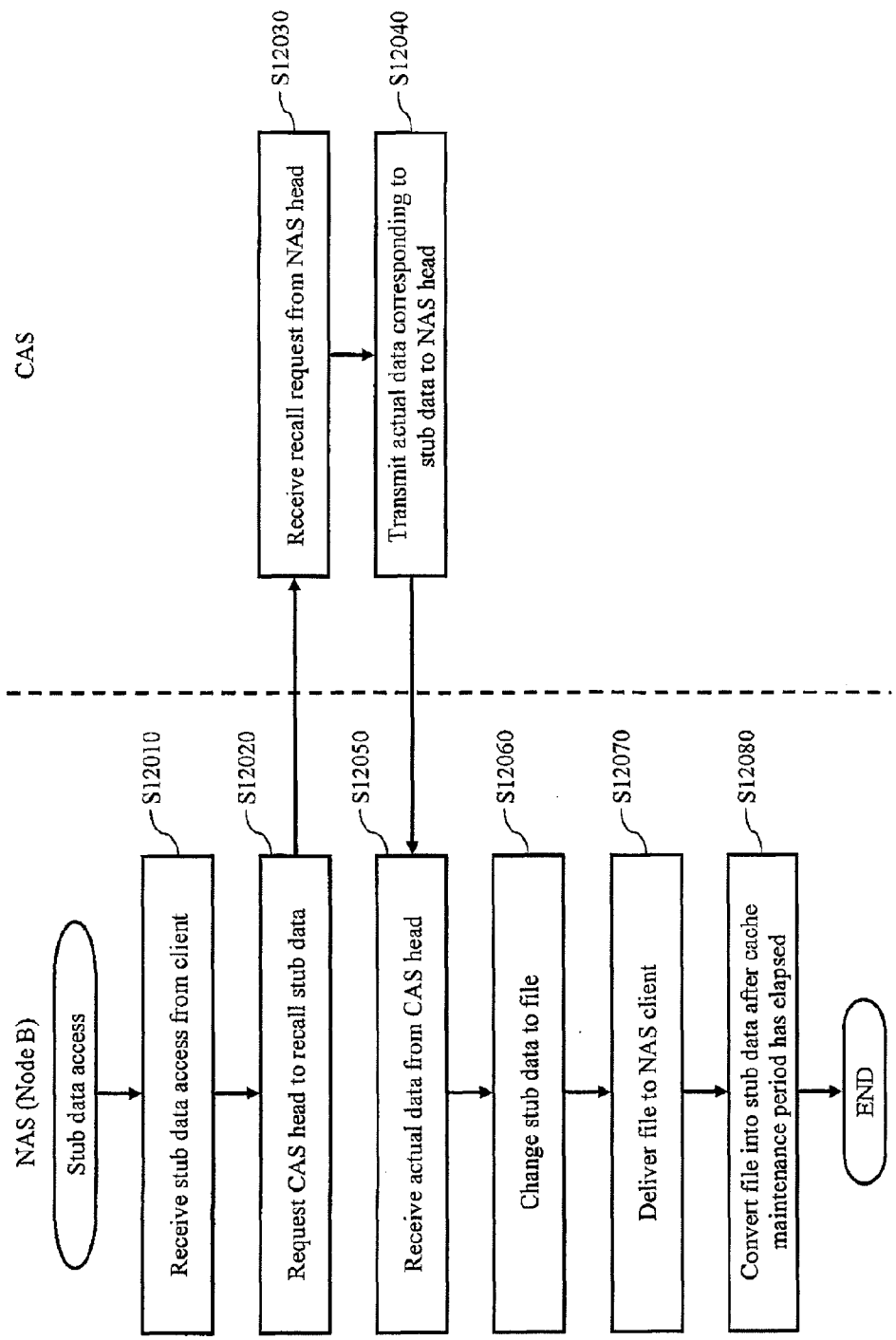
FIG. 12 is a flowchart illustrating a process executed when a NAS client accesses a stub in a data sharing FS at another base according to the embodiment of the present invention.

FIG. 12 is a flowchart illustrating a process executed when the NAS client at the base B accesses the stub data on the file system A' 3110. The processing in S12080 is not executed if the NAS client at the base A accesses the stub data on a normal file system, for example, the file system A 3000. Furthermore, the present process is executed when the NAS client accesses the stub data for a file access. When a NAS client such as a backup server accesses the stub data for backup, the system determines the access to be for backup and avoids executing the process shown in FIG. 12, in accordance with the technique disclosed in Patent Literature 1. That is, during an access for backup, the conversion from stub data into a file (recall process) is not executed.

In S12010, the NAS head 1100 at the base B receives a stub data access from the NAS client.

In S12020, the NAS head 1100 requests the CAS head 1200 to recall the accessed stub data.

In S12030, the CAS head 1200 receives a recall request from the NAS head 1000.

In S12040, the CAS head 1200 acquires the actual data corresponding to the stub data from the volume 2800, and transmits the actual data to the NAS head 1000.

In S12050, the NAS head 1100 receives the actual data corresponding to the stub data from the CAS head 1200.

In S12060, the NAS head 1100 uses the received actual data to convert the stub data into a file containing the actual data. At this time, the stub data is deleted.

In S12070, the NAS head 1100 responses to the NAS client having requested the access, with the acquired file.

In S12080, the NAS head 1100 references the cache maintenance period 8030 for the file in the inter-base data sharing setting table 2460 to schedule a stubbing process again. Then, at the scheduled time, the file is stubbed again. More specifically, in S12080, the NAS head 1100 requests the CAS head 1200 to notify the NAS head 1100 of the cache maintenance period 8030 for the file. In response to the request, the CAS head 1200 references the inter-base data sharing setting table 24260 to acquire the cache maintenance period information on the file. The CAS head 1200 notifies the NAS head 1100 of the information.

(2) Second Embodiment

A second embodiment of the present invention will be described below. In the following description, differences from the first embodiment will be mainly described. The description of matters common to the first embodiment is omitted or simplified.

In the second embodiment of the present invention, the data sharing/not sharing between bases is not set in ACL information in each of the stubs, files, and directories but in an inter-base data sharing setting table 2460. Setting the data sharing in the inter-base data sharing setting table 2460 allows the administrator of each base or the data center to easily set the data sharing among the bases in a batch. In this case, the settings in the ACL information may be different from those in the inter-base data sharing setting table 2460. However, the settings in the inter-base data sharing setting table 2460 are used to determine whether or not to perform restoration in a restore process for creating and updating a data sharing file system. Thus, if restoration is performed, the ACL information is also restored. Hence, users inhibited from accessing the data as indicated in the ACL information cannot make any accesses.

<Configuration Example of a Data Sharing Setting Table>

Figure 13:
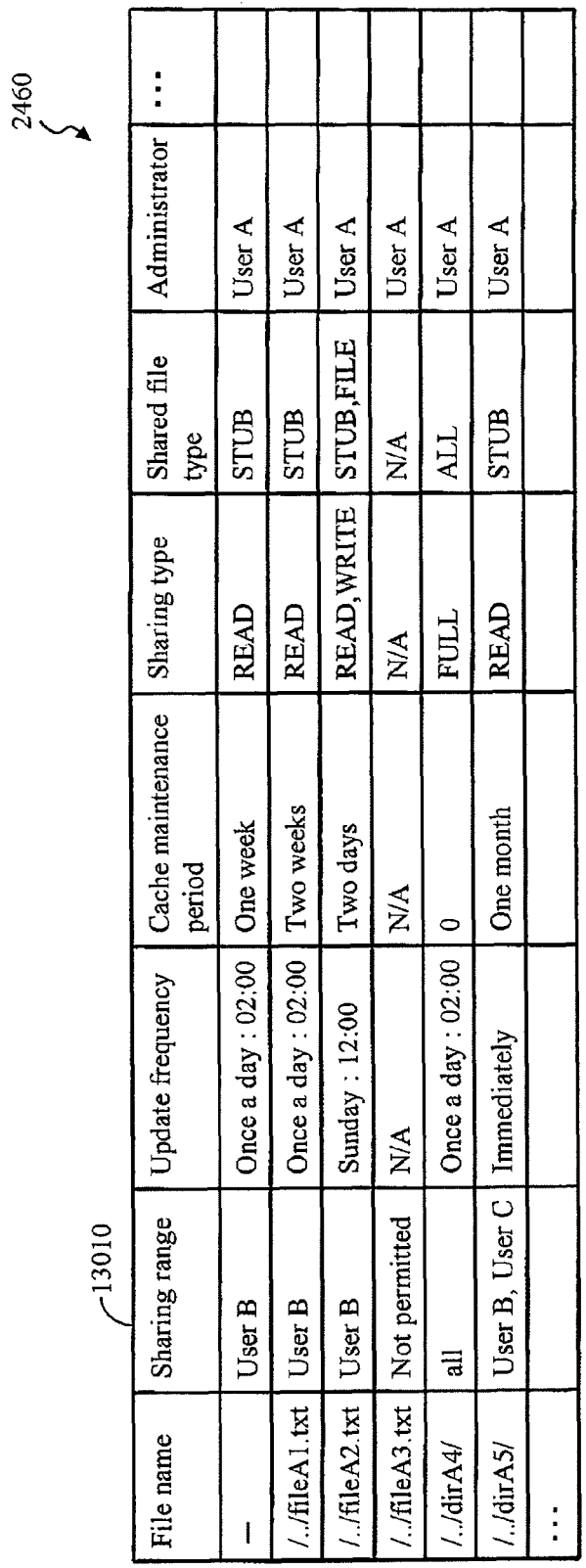
FIG. 13 is a diagram showing a configuration example of an inter-base data sharing setting table according to a second embodiment of the present invention.

FIG. 13 is a diagram showing a configuration example of the inter-base data sharing setting table 2460 according to the second embodiment of the present invention.

The inter-base data sharing setting table 2460 in FIG. 13 contains not only the table items shown in FIG. 8 but also a sharing range 13010. The information in the sharing range 13010 is used to determine whether or not to perform restoration in a restore process for creating and updating a data sharing file system at another base as shown in FIG. 9 or FIG. 10.

For example, in S9040 in FIG. 9, if user B is input as a parameter for a sharing user, only the stubs, files, and directories with the user B registered in the sharing range 13010 are restored. The stubs, files, and directories with the user B not registered in the sharing range 13010 fail to be restored. In this case, some of the stubs, files, and directories with the user B registered in the sharing range 1310 but inhibited from being accessed as indicated in the ACL information are also restored. However, in this case, since the ACL information is also restored, if the user B attempts to access any of the stubs, files, and directories in the completely restored data sharing file system, the user B fails to make the access as a result of the ACL setting. That is, for accesses, if the contents of the sharing range 13010 in the inter-base data sharing setting table are different from those of the ACL information, the ACL information is given top priority.

Furthermore, in the second embodiment of the present invention, the sharing determination shown in S10030 in the restore process shown in FIG. 10 is not made using the ACL information but using the registered value in the sharing range 13010.

The sharing range 13010 may be set by reading the ACL information in the backup data 2450 instead of being manually input by the administrator. For example, if the settings in the ACL information for /../fileA1.txt includes the user name: user B and the access control: READ, then the user B and READ are set in the sharing range and the sharing type, respectively, for the file name: /../fileA1.txt in the inter-base data sharing setting table 2460. An advantage of this method is that referencing the inter-base data sharing setting table 2460 allows the administrator and user to easily determine the data sharing range. Another advantage is that in the restore process shown in FIG. 10 and other figures, it is possible to execute an internal process of restoring only the data permitted to be shared as indicated in the sharing range 13010 in the inter-base data sharing setting table 2460, instead of carrying out the sharing determination in S10030 for each of the stubs, files, and directories. This is expected to reduce overhead to improve performance.

<Example of a Setting Screen for the Inter-Base Data Sharing Setting Table>

Figure 14:
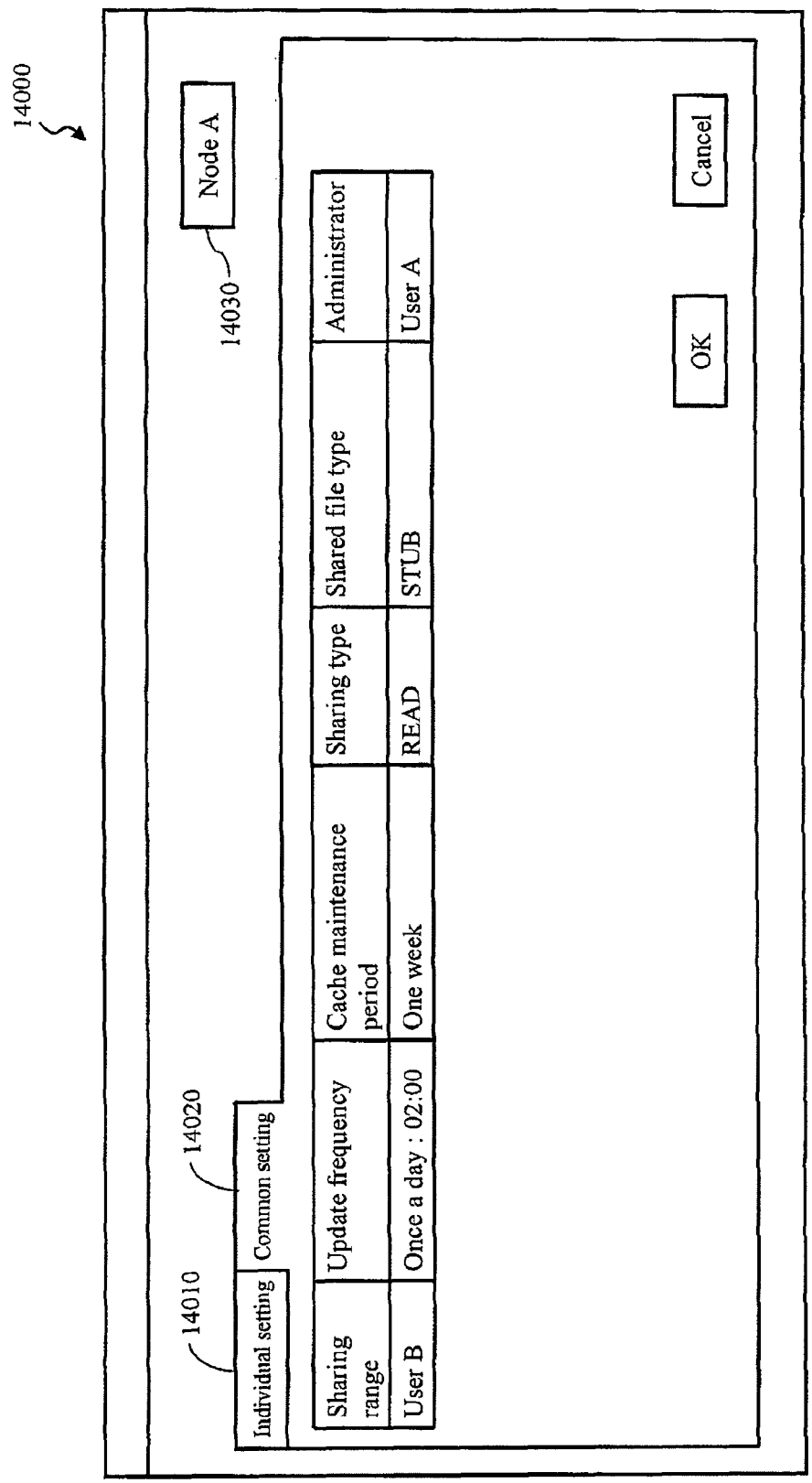
FIG. 14 is a diagram showing an example (1) of a setting screen for the inter-base data sharing setting table according to the embodiment of the present invention.
Figure 15:
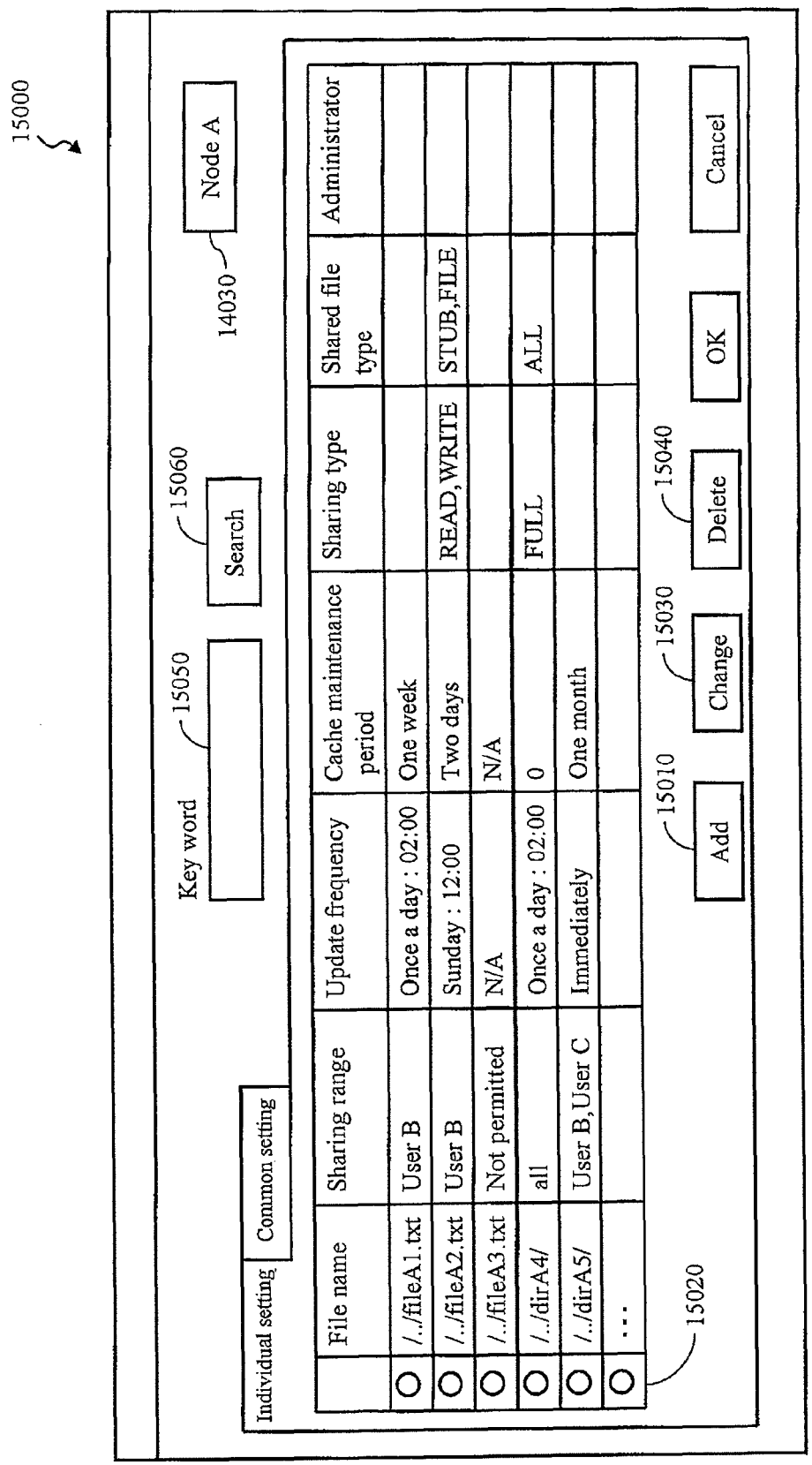
FIG. 15 is a diagram showing an example (2) of a setting screen for the inter-base data sharing setting table according to the embodiment of the present invention.

FIGS. 14 and 15 are diagrams showing an example of a setting screen for the inter-base data sharing setting table 2460. For example, a request from the CAS client 1400 allows the setting screen to be displayed. Furthermore, the inter-base data sharing setting table 2460 is set by, for example, the CAS client 1400.

More specifically, a setting screen 14000 includes, for example, an individual setting tab 14010 and a common setting tab 14020 as a tab function. For example, on a display device (not shown in the drawings) of the CAS client 1400, when the common setting tab in the displayed setting screen is clicked, the common setting tab shown in FIG. 14 is displayed. When the individual setting tab in the displayed setting screen is clicked, the individual setting tab shown in FIG. 15 is displayed.

FIG. 14 is a diagram showing an example of a common setting screen. Making individual settings for the stubs, files, and directories is burdensome. Thus, in FIG. 14, common setting values are applied to the stubs, files, and directories other than those individually set. Thus, individual settings may be made exclusively for the stubs, files, and directories for which settings different from common settings are to be exceptionally made. This enables a reduction in setting burdens on the administrator and user. The common settings can be made for each base. A base setting item 14030 can be used to switch the base.

FIG. 15 is a diagram showing an example of an individual setting screen. FIG. 15 shows a setting screen 15000 used to make settings for the stubs, files, and directories for which settings different from the common settings are to be made. In FIG. 15, the common settings can be made for each base by using the base setting item 14030 to select any of the bases. Furthermore, an addition button 15010 can be used to newly add a stub, a file, and a directory to be registered. Moreover, a select button 15020 can be used for selection. A change button 15030 can be used for a change. A delete button 15040 can be used for deletion. Additionally, to enable batch settings based on key words, the screen includes a key word input field 15050 and a search button 15060. For example, inputting the key word ".txt" for search allows settings to be made, in a batch, for all the stubs and files (text files) that include ".txt" in the file name. Furthermore, meta data such as an owner or a file creation date may be searched for.

(3) Conclusion

In the first embodiment, the NAS device at each base is connected to the CAS device at the data center by the WAN. At least a part of the backup data at the base A is restored at the base (for example, the base B) with which the data is to be shared, using the ACL (Access Control List in which, for example, data indicating whether or not the file is permitted by the user at the base A to be made public and shared, or users permitted to share the data are set), the backup data at each base which is stored in the CAS device (for example, the backup data at the base A), and the inter-base data sharing setting table. Thus, a data sharing file system is created at the base (base B) with which the data is to be shared. At this time, with reference to the ACL in the backup data, only the stubs or files permitted to be accessed by the restore target base are restored. This eliminates the need to store files to be shared, in a shared directory. The cumbersomeness of a sharing process can be avoided.

Furthermore, data sharing is achieved such that with the actual data located on the CAS device at the data center, the stub data is stored in the NAS devices at the respective bases sharing the data. If the stub data is present in the backup data at the base, the stub data is restored. This allows a copy process for data sharing to be omitted and enables the capacity of the CAS device to be saved.

Moreover, the following configuration is possible for files that are not to be data-shared. The user at another base is inhibited from accessing the files. No stub data is present at this base. Thus, even the presence of files can be hidden, allowing high security to be ensured.

Furthermore, if the original data for the shared data is updated, the shared data is also automatically updated. This eliminates the need for the user to re-store the data in a shared directory. Moreover, for a shared file being accessed, the actual data is copied to the base accessing the file, as a cache for a set period. Thus, even if the connection to the WAN is deleted or the data center is shut down, the access can be continued.

In the second embodiment, at least a part of the backup data at each base stored in the CAS device (for example, the backup data at the base A) is restored at the base (for example, the base B) with which the data is to be shared, using the inter-base data sharing setting table further containing information indicative of the user sharing range (whether or not the user is permitted to share the data). Thus, a data sharing file system is created at the base (base B) with which the data is to be shared. The second embodiment determines whether or not the data is to be restored based on the information indicative of the user sharing range, instead of selecting the data to be restored from the backup data, based on the ACL. When the inter-base data sharing setting table contains the information indicating whether or not the data sharing is permitted, whether the data is to be shared or not can be controlled even if no ACL is set. In this case, with reference to the inter-base data sharing setting table, only the stubs or files permitted to be accessed by the restore destination base are restored. However, whether or not the restore destination data sharing file system permits accesses is determined based on the ACL. Thus, a shared file system can be created at another base in such a manner that files inhibited from being accessed but which may be known to be present are distinguished from files that are to be inhibited even from being known to be present.

The inter-base data sharing setting table may be automatically set based on the ACL information.

Moreover, the present invention can be implemented by adding functions to the conventional art through software. This eliminates the need to add infrastructures. The present invention eliminates the need for the communication between the bases and thus the need to add a communication infrastructure to between the bases for data sharing. Furthermore, the data sharing file system created at each base may be formed only of stubs. Thus, the data sharing file system requires only a small capacity and requires no addition of storage. Additionally, the backup data acquired for recovery performed when a disaster or a fault occurs at the base can be utilized for the data sharing file system. Hence, the data center also requires no addition of storage.

Furthermore, the present invention can be carried out by software program codes that implement the functions of the embodiments. In this case, a storage medium in which the program codes are recorded is provided to a system or an apparatus. A computer (or a CPU or an MPU) in the system or apparatus reads the program codes stored in the storage medium. In this case, the program codes themselves read from the storage medium implement the functions of the embodiments. The program codes themselves and the storage medium in which the program codes are stored form the present invention. The storage medium for providing the program codes may be, for example, a flexible disk, a CD-ROM, a DVD-ROM, a hard disk, an optical disk, a magnetooptic disk, a CD-R, a magnetic tape, a nonvolatile memory card, or a ROM.

Alternatively, based on instructions in the program codes, an OS (Operating System) or the like operating on the computer may execute a part or all of the actual processing so that the processing implements the functions of the above-described embodiments. Moreover, the program codes read from the storage medium may be written to a memory on the computer. Then, based on the instructions in the program codes, the CPU or the like in the computer may execute a part or all of the actual processing so that the processing implements the functions of the above-described embodiments.

Alternatively, the software program codes that implement the functions of the embodiments may be distributed via a network and stored in storage means such as a hard disk or a memory in the system or apparatus or a storage medium such as a CD-RW or a CD-R. Then, when the program codes are used, the computer (or CPU or MPU) in the system or apparatus may read and execute the program codes stored in the storage means or the storage medium.

Finally, it should be appreciated that the processes and techniques described herein are essentially not related to any particular apparatus and can be implemented by any suitable combination of components. Moreover, various types of general-purpose devices can be used in accordance with the teachings described herein. It may be understood a dedicated apparatus is advantageously constructed and used to execute the steps of the method described herein. The present invention has been described in conjunction with the specific examples. However, the examples are not intended for limitation but for illustration in any sense. Those skilled in the art will conceive many combinations of hardware, software, and firmware which are suitable for carrying out the present invention. For example, the described software can be implemented in a wide variety of programs or script languages such as assembler, C/C++, perl, Shell, PHP, and Java (registered trade marks).

In addition, other implementations of the present invention will be apparent to those having ordinary knowledge in the art, through discussions of the specification and embodiments of the present invention disclosed herein. Various aspects and/or components of the described embodiments can be used independently or in any combination, in a computerized storage system providing a function to manage data. The specification and specific examples are only typical, and the scope and spirits of the present invention will be shown below in the claims.

REFERENCE SIGNS LIST

1000, 1100 NAS heads
1200 CAS head
1500, 1600, 1700 Storage systems
1300, 1310, 1320, 1330, 1340, 1350 NAS clients
1400 CAS client
1800 Base A
1810 Base B
1820 Data center
2210 File system A
3100 File system B
3110 Data sharing file system A'
2420 Tenant A
2430 Tenant B
2440 Sharing system tenant

The invention claimed is:

1. A method for managing an information processing system comprising first and second sub-computer systems and a data management computer system coupled with the first and second sub-computer systems,
the first sub-computer systems comprising a first storage subsystems to provide data to client computers,
the second sub-computer system comprising a second storage subsystem to provide data to client computers,
the data management computer system comprising a third storage subsystem, wherein the data management computer system manages the data shifted from each of the first and second sub-computer systems, the method comprising:

the data management computer system storing backup data for the first sub-computer system in the third storage subsystem and the data management computer system managing data sharing setting information for each file or directory, wherein the data sharing setting information includes (i) update frequency information, as scheduling information on restore processing of the backup data, indicative of timing at which a data sharing file system in the second sub-computer system is updated by re-restoration, for each file or directory, (ii) reference information indicative of whether the second sub-computer system references the backup data for each file or directory, (iii) cache maintenance period information indicative of a period from conversion into a file of stub data accessed by a client computer until the file is re-stubbed, for each file or directory and (iv) access user information indicative of who can set and modify data sharing information for each file or directory, wherein, if data stored in the storage subsystem of the first sub-computer system is changed, the data management computer system keeps original backup data before changed corresponding to the changed data in the third storage subsystem until data migration process from the first sub-computer system to the data management computer system is executed and reflects the change in the data in the original backup data when the data migration process is executed, wherein the second sub-computer system references the original backup data before changed in the third storage subsystem via stub data until next restore process is executed in accordance with the scheduling, and wherein the original backup data is deleted from the third storage sub system when a given period has elapsed.

2. The method for managing the information processing system according to claim 1, wherein the plurality of sub-computer systems use the storage subsystems, respectively, to provide a Network Attached Storage (NAS) file system, the first and second sub-computer systems store stub data corresponding to the data shifted to the data management computer system, in the NAS file system, the shared file system includes shared data stub data, the data included in the backup data includes access control information indicating whether or not a user is permitted to access the data and a range of the access, the data management computer system manages scheduling information on the restore process, when executing the restore process, the data management computer system determines whether or not to execute the restore process on the data included in the backup data, based on the access control information, (i) if data stored in the storage subsystem in the first subcomputer system is changed, the data management computer system reflects the change in the data in the backup data, the data management computer system executes the restore process again in accordance with the scheduling information at a timing different from a timing when the change in the data is reflected in the backup data, (ii) if the first or second sub-computer system uses the stub data to access the data, the data management computer system transmits actual data corresponding to the stub data to the sub-computer system having made the access request, upon receiving the actual data, the sub-computer system replaces the stub data with the actual data, holds the actual data for a predetermined period, and after the predetermined period elapses, returns the actual data to the corresponding stub data, (iii) if the second sub-computer system uses the shared data stub data to access the data, the data management computer system transmits shared actual data corresponding to the shared stub data, to the second sub-computer system, and the second sub-computer system replaces the shared data stub data with the shared actual data, holds the shared actual data for a predetermined period, and after the predetermined period elapses, returns the shared actual data to the corresponding shared data stub data.

3. The method for managing the information processing system according to claim 1, wherein the backup data comprises plural types of data, and the data management computer system manages the reference information for each data of the plural types of data.

4. The method for managing the information processing system according to claim 1, wherein the first and second sub-computer systems store stub data corresponding to the data shifted to the data management computer system, in the respective storage subsystems, if the first or second sub-computer system uses the stub data to access the data, the data management computer system transmits actual data corresponding to the stub data, to the subcomputer system having made the access request, and upon receiving the actual data, the sub-computer system replaces the stub data with the actual data, holds the actual data for a predetermined period, and after the predetermined period elapses, returns the actual data to the corresponding stub data.

5. The method for managing the information processing system according to claim 4, wherein the shared file system includes shared data stub data, if the second sub-computer system uses the shared data stub data to access the data, the data management computer system transmits the shared actual data corresponding to the shared stub data, to the second sub-computer system, and the second sub-computer system replaces the shared data stub data with the shared actual data, holds the shared actual data for a predetermined period, and after the predetermined period elapses, returns the shared actual data to the corresponding shared data stub data.

6. The method for managing the information processing system according to claim 1, wherein the data included in the backup data includes access control information indicating whether or not a user is permitted to access the data and a range of the access, and based on the access control information, the data management computer system determines whether or not to execute the restore process on the data included in the backup data.

7. The method for managing the information processing system according to claim 1, wherein the data management computer system manages sharing range information indicative of a range of users permitted to share the data included in the backup data, and based on the sharing range information, determines whether or not to execute the restore process on the data included in the backup data.

8. The method for managing the information processing system according to claim 7,
wherein the data included in the backup data includes access control information indicating whether or not the user is permitted to access the data and the range of the access, and
the second sub-computer system processes an access request from any of the client computers for the shared file system generated by the restore process, based on the access control information instead of the sharing range information used for the restore process, to determine whether or not to permit the access.

9. A data management computer system coupled with first and second sub-computer systems to manage data shifted from the first and second sub-computer systems,
the data management computer system comprising a control device and a storage system with a disk device, wherein the storage system stores backup data for the first sub-computer system,
the control device manages data sharing setting information for each file or directory, wherein the data sharing setting information includes (i) update frequency information, as scheduling information on restore processing of the backup data, indicative of timing at which a data sharing file system in the second sub-computer system is updated by re-restoration, for each file or directory, (ii) reference information indicative of whether the second sub-computer system references the backup data for each file or directory, (iii) cache maintenance period information indicative of a period from conversion into a file of stub data accessed by a client computer until the file is re-stubbed, for each file or directory and (iv) access user information indicative of who can set and modify data sharing information for each file or directory,
wherein, if data stored in the storage system of the first sub-computer system is changed, the control device keeps original backup data before changed corresponding to the changed data in the storage sub system until data migration process from the first sub-computer system to the data management computer system is executed and reflects the change in the data in the original backup data when the data migration process is executed,
wherein the control device manages the second sub-computer system to reference the original backup data before changed in the storage subsystem via stub data until next restore processing of backup data is executed in accordance with the scheduling information, and
wherein the original backup data is deleted from the storage system when a given period has elapsed.

10. The data management computer system according to claim 9, further comprising:
a management computer for an administrator,
wherein the data included in the backup data includes access control information indicating whether or not a user is permitted to access the data and a range of the access,
based on the access control information, the control device determines whether or not to execute the restore process on the data included in the backup data,
the control device further manages scheduling information on the restore process,
if the data stored in the first sub-computer system is changed, the control device reflects the change in the data in the backup data,
the control device executes the restore process again in accordance with the scheduling information at a timing different from a timing when the change in the data is reflected in the backup data,
if the second sub-computer system uses shared data which is a part of the backup data and which is stub data for corresponding shared actual data to access the corresponding actual data stored in the storage subsystem, the control device transmits the shared actual data corresponding to the shared data stub data to the second sub-computer system, and
the management computer allows a display device to display a setting screen required to set data sharing setting information including the data sharing permission/inhibition information, the scheduling information on the restore process, and cache maintenance period information indicative of a period for which the shared actual data is held in the second sub-computer system if an access is made with the shared stub data.

11. The data management computer system according to claim 9, wherein the control device manages the scheduling information on the restore process,
if the data stored in the first sub-computer system is changed, the control device reflects the change in the data in the backup data, and
the control device executes the restore process again in accordance with the scheduling information at a timing different from a timing when the change in the data is reflected in the backup data.

12. The data management computer system according to claim 9,
wherein if the second sub-computer system uses shared data which is a part of the backup data and which is stub data for corresponding shared actual data to access the corresponding actual data stored in the storage system, the control device transmits the shared actual data corresponding to the shared data stub data to the second sub-computer system.

13. The data management computer system according to claim 9,
wherein the data included in the backup data includes access control information indicating whether or not a user is permitted to access the data and a range of the access, and
based on the access control information, the control device determines whether or not to execute the restore process on the data included in the backup data.

14. The data management computer system according to claim 9,
wherein the control device manages sharing range information indicative of a range of users permitted to share the data included in the backup data, and based on the sharing range information, determines whether or not to execute the restore process on the data included in the backup data.

15. The data management computer system according to claim 12, further comprising:
a management computer for an administrator,
wherein the management computer allows the display device to display the setting screen required to set data sharing setting information including the data sharing permission/inhibition information, the scheduling information on the restore process, and cache maintenance period information indicative of the period for which the shared actual data is held in the second sub-computer system if an access is made with the shared stub data.

* * * * *